United States Patent [19]

Gallaher, Jr.

[11] Patent Number: 4,967,267
[45] Date of Patent: Oct. 30, 1990

[54] APPARATUS FOR FORMATTING AND VIEWING A STEREOSCOPIC VIDEO FRAME

[75] Inventor: John K. Gallaher, Jr., Winston-Salem, N.C.

[73] Assignee: Gallaher Business Development Corp., Winston-Salem, N.C.

[21] Appl. No.: 377,049

[22] Filed: Jul. 10, 1989

[51] Int. Cl.⁵ .............................................. H04N 13/00
[52] U.S. Cl. ........................................ 358/88; 358/87; 358/89; 358/90; 358/91; 358/92
[58] Field of Search ........................ 358/86, 87, 88, 89, 358/90, 91, 92

[56] References Cited

U.S. PATENT DOCUMENTS 2,845,618  7/1958  Huffman ................................ 358/88
4,647,966  3/1987  Phillips et al. ......................... 358/88

Primary Examiner—Howard W. Britton
Assistant Examiner—Michael H. Lee

[57] ABSTRACT

A apparatus for formatting a stereoscopic video frame rotates one of the left or right image of a stero video image pair 90 degrees counterclockwise to form one-half of the stereoscopic video frame and independently rotates 90 degrees counterclockwise and optically inverts the other of the left or right image to form the other half of the stereoscopic video frame. For viewing the formatted stereoscopic video frame, the left or right image of the formatted video frame is rotated 90 degrees clockwise and the other of the left or right image of the formatted video frame is independently rotated 90 degrees clockwise and optically reverted and the two images are combined on a common viewing surface for viewing.

13 Claims, 4 Drawing Sheets

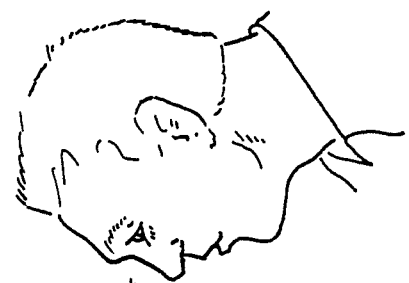
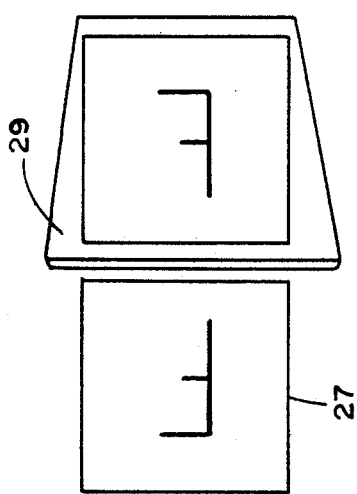
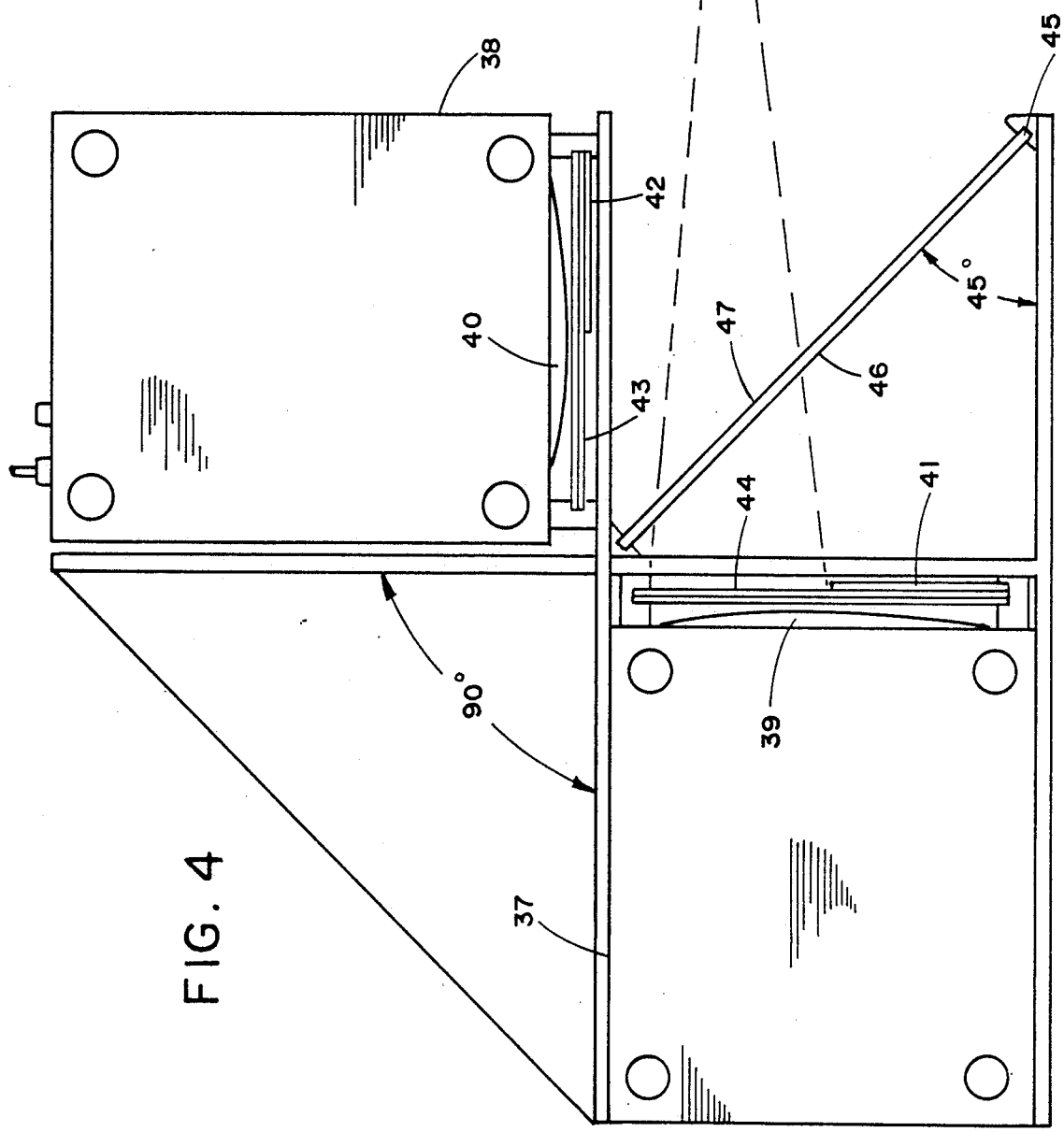

APPARATUS FOR FORMATTING AND VIEWING A STEREOSCOPIC VIDEO FRAME

BACKGROUND OF THE INVENTION

This invention relates to a method apparatus for formatting a stereoscopic video frame and for stereoscopic viewing of the formatted video frame.

Present day methods of formatting and stereoscopically viewing video images evolved from early devices which combined photographs or images of the same object or scene taken from slightly different points of view (corresponding to the positions of the two eyes) by means of mirrors placed at a suitable angle or by two tubes, each containing a lens, through which the two photographs or images were viewed by the corresponding eyes to obtain a single image to give the impression of solidity or relief as in ordinary vision of the scene or object itself.

The most commonly employed methods of formatting a stereoscopic video frame involve generating the left and right images of a stereo video image pair using a pair of spaced apart video cameras directed towards the left and right sides of a common subject and displaying the left and right images separately on a single video screen, either in over-under or side-by-side relationship. Polarizing filters are used to polarize the light emitted by the two images at 90 degrees with respect to each other, and the images are viewed through viewing devices such as those disclosed in U.S. Pat. No. 4,740,836 to Craig; U.S. Pat. No. 4,559,556 to Wilkins; U.S. Pat. No. 4,523,226 to Lipton et al.; U.S. Pat. No. 4,583,117 to Lipton et al.; and U.S. Pat. No. 4,709,263 to Brumage; which have correspondingly polarized lenses so that the left image is viewed by the left eye through the left lens and the right image is viewed by the right eye through the right lens.

Such viewing devices require complicated adjustments to focus and combine the left and right images which are difficult to make and, once made, require the viewer to remain at a fixed distance from the video screen While it is possible to pre-adjust the viewing device and make the pre-adjustment fixed, when such pre-adjustment is fixed, the distance from which the video screen must be viewed is dictated by the pre-adjustment and the size of the video screen. In either case, it has been found that the distance from which the video screen must be viewed with such viewing devices is uncomfortably close.

Further, such viewing devices are bulky and uncomfortably heavy, and since prisms are used, it is impossible for the viewer to look away from the video screen and observe anything else in the viewing area without visual distortion.

A further deficiency resulting from the over-under format, as disclosed in U.S. Pat. No. 4,559,556 and U.S. Pat. No. 4,740,836 is the loss in the vertical dimension in the stereoscopic video image which is perceived by the viewer through such viewing devices For example, in the over-under format using a conventional cathode ray tube having a horizontal to vertical dimension ratio of approximately 1.85 to 1, the left and right images are presented on the upper and lower halves of the cathode ray tube having horizontal to vertical dimension ratios of approximately 3.7 to 1 each, while in the side-by-side format using the same conventional cathode ray tube, the left and right images are presented on the left and right halves of the cathode ray tube having horizontal to vertical dimension ratios of approximately 0.93 to 1 each.

Finally, it is obvious that such viewing devices cannot be used by a viewer who is required to wear glasses.

In order to overcome some of the foregoing deficiencies, viewing systems have been devised which can be characterized as "table-top" such as those disclosed in U.S. Pat. No. 4,568,970 to Rockstead and U.S. Pat. No. 4,743,964 to Allard et al. which use an array of mirrors to create optical paths for the left and right images of the stereovideo image pair and provide left and right fixed openings through which the viewer simultaneously views the left and right images. Such devices replace the unwieldy head-worn viewing devices with table-top viewing devices, but the viewer must remain a fixed distance from the viewing device in order to properly view the stereoscopic image pair.

Still other devices have been proposed such as those disclosed in U.S. Pat. No. 2,845,618 to Huffman; U.S. Pat. No. 4,190,856 to Ricks; and U.S. Pat. No. 4,658,291 to Morishita which use a beam splitter to combine the left and right images on a single viewing surface.

A major flaw found in all of the prior art devices results in distortion which is found when the left and right images are combined to form a single stereoscopic image. This distortion results from the fact that the face of the cathode ray tube which is used as the display screen is curved and not flat and the corners are rounded and not square. Accordingly, the left and right video images are geometrically distorted to some extent in the corners and along the outer edges of the video display screen. Because of the geometric distortion created by the curved screen, the left and right images displayed on the upper and lower or left and right halves of a single video screen cannot be optically combined in overlapping fashion without noticeable distortion.

SUMMARY OF THE INVENTION

The present invention overcomes the problems associated with the prior art and provides an apparatus for formatting a stereoscopic video frame and for stereoscopically viewing the video frame thus formatted.

In accordance with the present invention, a stereoscopic video frame is formatted by rotating either the left or right image of a stereo video image pair 90 degrees counterclockwise to form one-half of the stereoscopic video frame and independently rotating 90 degrees counterclockwise and optically inverting the other of the left or right image to form the other half of the stereoscopic video frame.

The formatted video frame is viewed by rotating the left or right image of the stereoscopic video frame 90 degrees clockwise and independently rotating 90 degrees clockwise and optically reverting the other of the left or right image of the stereoscopic video frame and combining the two images on a common viewing surface for viewing.

The left and right images are thus combined in a manner analogous to folding the right image of the stereoscopic video frame onto its left image or vice versa. Thus, the geometric distortion caused by simply superimposing the left half of a video screen onto its right half or the lower half of a video screen onto its upper half is eliminated.

It is, therefore, an object of the present invention to provide an improved apparatus and method for formatting a stereoscopic video frame and for stereoscopic viewing of the formatted video frame which eliminates geometric distortion of the combined images.

Another object of the present invention is to provide an improved apparatus and method for formatting a stereoscopic video frame which affords a horizontal to vertical dimension ratio of approximately 0.93 to 1.

Another object of the present invention is to provide an apparatus for viewing the formatted stereoscopic video frame which does not require the viewer to remain at a fixed distance from the viewing apparatus but enables the viewer to move about the viewing area.

Another object of the present invention is to provide a portable viewfinding means enabling the user to align and focus the video cameras used to generate the stereo video image pair.

Another object of the present invention is to provide a means and method of viewing the formatted stereoscopic video frame at a remote location, or video recording of the formatted stereoscopic video frame.

These and other objects and advantages of the present invention will become more apparent after consideration of the following detailed specification taken in conjunction with the accompanying drawings wherein like characters of reference designate like parts throughout the several views.

BRIEF DESCRIPTION OF THE DRAWINGS

FIG. 3 is a schematic representation of the formatted stereoscoprc video frame in accordance with the invention.

FIG. 4 is a side schematic view of a device capable of viewing the formatted stereoscopic video frame in accordance with the invention.

DETAILED DESCRIPTION OF THE PREFERRED EMBODIMENT

Reference will now be made in detail to a preferred embodiment of the invention which is illustrated in the accompanying drawings.

Figure 1:
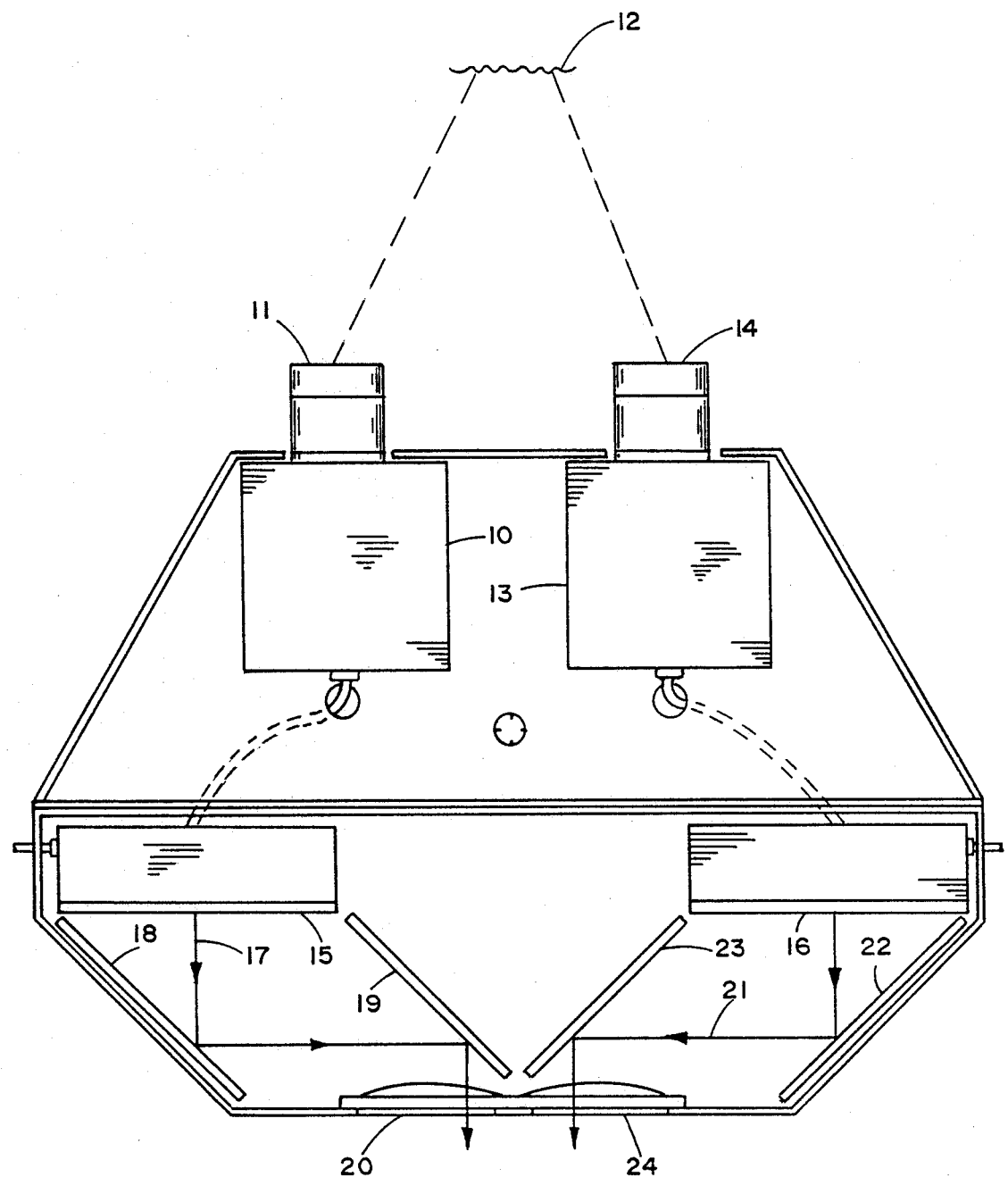
FIG. 1 is a top schematic view of a device capable of generating the left and right images of a stereo video image pair.

FIG. 1 shows a first video camera 10 having its lens 11 directed toward the left side of a scene 12 and a second video camera 13 having its lens 14 directed at the right side of scene 12. Video cameras 10 and 13 are laterally spaced from each other so that the left and right views of scene 12 perceived through lenses 11 and 14 correspond generally to the left and right views which would be perceived by the left and right eyes of a viewer.

The left image of scene 12 perceived through lens 11 of camera 10 is transmitted to LCD monitor screen 15 and displayed thereon. The right image of scene 12 perceived through lens 14 of camera 13 is transmitted to LCD monitor screen 16 and displayed thereon. Light emitted by the left image displayed on LCD monitor screen 15 is deflected along optical path 17 by reflective surface mirrors 18 and 19 to left eye piece 20, and the right image displayed on LCD monitor 16 is deflected along optical path 21 by reflective surface mirrors 22 and 23 to right eye piece 24 to provide a means whereby an operator may adjust the alignment and focus of video cameras 10 and 13.

Figure 2:
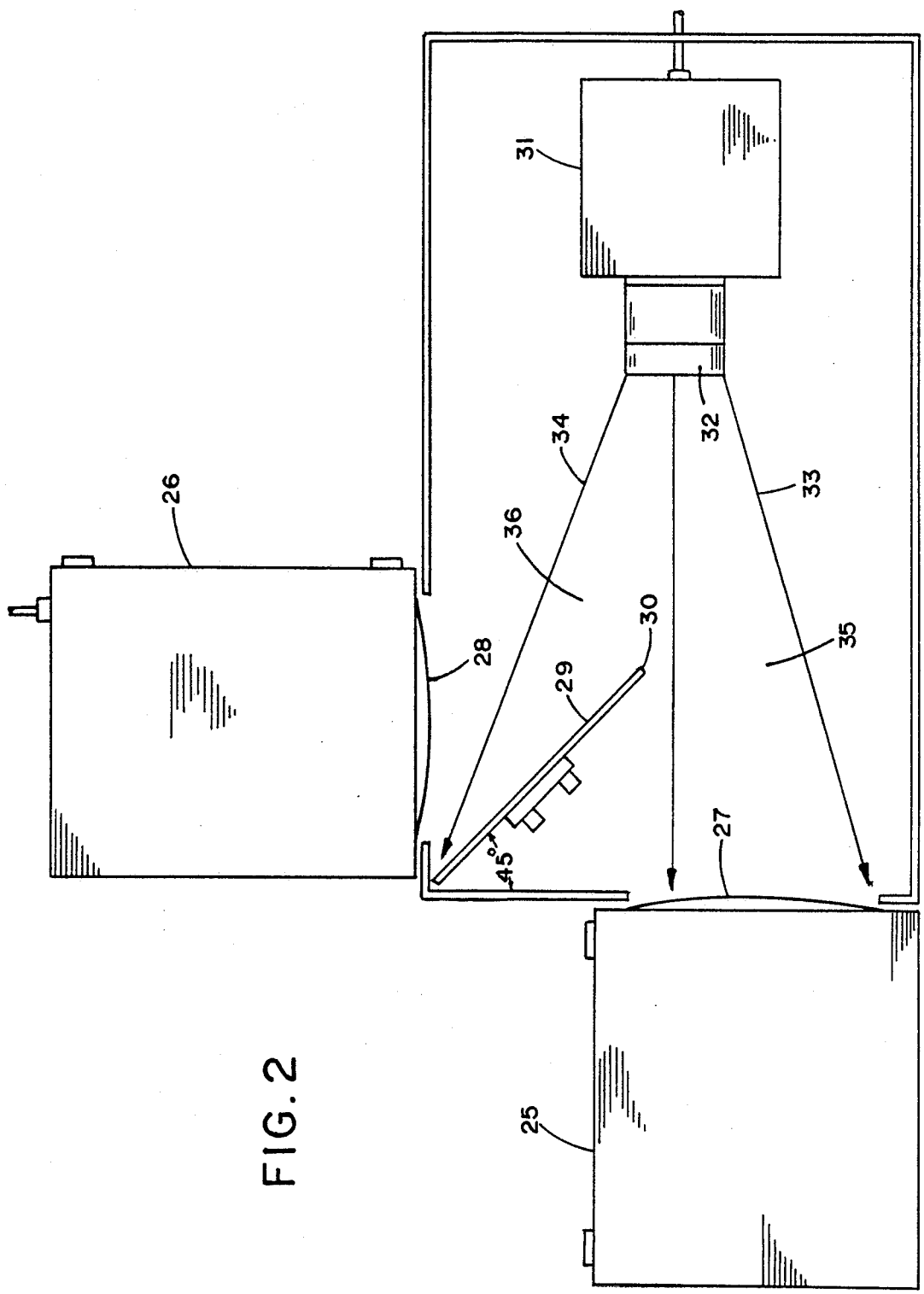
FIG. 2 is a top schematic view of a device capable of formatting the stereoscopic video frame of the invention.

The left image generated by video camera 10 is transmitted by appropriate means to video monitor 25, as shown in FIG. 2, which is rotated 90 degrees counterclockwise, and the right image generated by video camera 13 is transmitted by appropriate means to video monitor 26 which is spaced from video monitor 25, positioned at a 90 degree angle with respect to video monitor 25 and likewise rotated 90 degrees counterclockwise. Thus the left image is displayed on video screen 27 of video monitor 25 rotated 90 degrees counterclockwise and the right image is displayed on video screen 28 of video monitor 26 likewise rotated 90 degrees counterclockwise.

Light emitted by the right image displayed on video screen 28 of video monitor 26 is reflected on the reflective surface 29 of reflective surface mirror 30, which bisects the 90 degree angle between video screens 27 and 28, and the inverted right image is displayed thereon. Video camera 31 having a lens 32 with a viewing field having left and right limits illustrated by lines 33 and 34, respectively, is directed toward video screen 27 and the reflective surface 29 of reflective surface mirror 30 so that the left image displayed on video screen 27 occupies the left half 35 of the viewing field and the right image displayed on reflective surface 29 of reflective surface mirror 30 occupies the right half 36 of the viewing field of lens 32.

FIG. 3 illustrates the formatted stereoscopic video frame as perceived through lens 32 of video camera 31. As can be seen, the left image, illustrated by the letter "F", is rotated 90 degrees counterclockwise and occupies the left half of the formatted frame, and the right image, likewise illustrated by the letter "F", is rotated 90 degrees counterclockwise, optically inverted, and occupies the right half of the formatted frame. The stereoscopic video frame as illustrated in FIG. 3 may be transmitted by appropriate means to a video recording device such as a video cassette recorder (not shown) for later viewing or it may be transmitted by appropriate means to a viewing apparatus as illustrated in FIG. 4 for immediate viewing.

Figure 5:
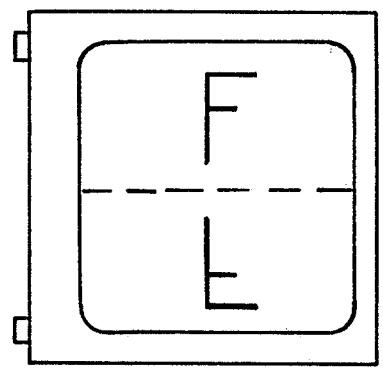
FIG. 5 is a schematic representation of the formatted stereoscopic video frame rotated 90 degrees clockwise in accordance with the invention.

The formatted stereoscopic video frame perceived through lens 32 of video camera 31 is transmitted by appropriate means to video monitors 37 and 38 of the viewing apparatus illustrated in FIG. 4. Video monitor 37 is rotated 90 degrees clockwise, and video monitor 38 is likewise rotated 90 degrees clockwise and positioned proximate video monitor 37 and at a 90 degree angle with respect thereto. Thus the formatted video frame is displayed on video screen 39 of video monitor 37 rotated 90 degrees clockwise as illustrated in FIG. 5, viewed from a position in front of video monitor 37, proximate and at a 90 degree angle with respect to the formatted video frame likewise displayed on video screen 40 of video monitor 38 rotated 90 degrees clockwise as likewise illustrated in FIG. 5, viewed from a position beneath video monitor 38.

The right image of the formatted video frame displayed on video screen 39 is masked from view by opaque sheet 41 and the left image displayed on video screen 40 is masked from view by opaque sheet 42. Polarizing sheets 43 and 44 polarize the light from the unmasked right image displayed on video screen 40 and the unmasked left image displayed on video screen 39 at 90 degrees with respect to each other.

Figure 6:
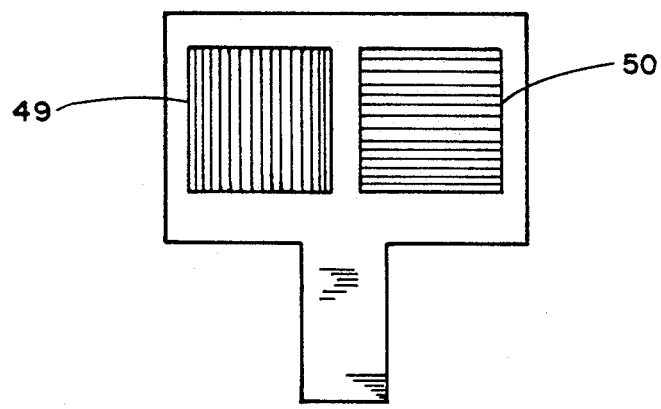
FIG. 6 is a front schematic view of a device for viewing the formatted stereoscopic video frame of the invention.

The unmasked left and right images are combined on a transparent panel 45 of the type used on computer displays, having an anti-glare coated surface 46 and an uncoated surface 47, which bisects the 90 degree angle between the unmasked left and right images displayed on video screen 39 and video screen 40, respectively. It has been found that a conventional half-silvered mirror (sometimes referred to in the prior art as a beam splitter) reflects one image well but poorly transmits the other image, whereas a transparent panel having an anti-glare coated surface both reflects and transmits the images well to provide a combined image equal in level of brightness to the images displayed on the respective video screens. The unmasked right image is reverted and combined with the unmasked left image on panel 45 and viewed by a viewer through a viewing device 48 such as illustrated in FIG. 6 having left and right transparent panels 49 and 50 likewise polarized at 90 degrees with respect to each other so that the left image is viewed on panel 45 through the left panel 49 and the right image is simultaneously viewed on panel 45 through the right panel 50. Thus the left and right images of the formatted frame are combined for viewing as if folded, one onto the other, rather than simply overlaid as in the prior art devices.

It will be apparent to those skilled in the art that various additions, substitutions, modifications, and omissions can be made to the apparatus and method of the present invention without departing from the scope or spirit of the invention. Thus, it is intended that the present invention cover the additions, substitutions, modifications, and omissions provided they come within the scope of the appended claims and their equivalents.

What is claimed is:

1. An apparatus for formatting the left and right images of a stereo video image pair of a scene in a single stereoscopic video frame, comprising:
    first means for rotating one of the images of the stereo video image pair 90 degrees with respect to the orientation of said scene to form one-half of a stereoscopic video frame;
    second means for rotating the other of the images of said stereo video image pair 90 degrees with respect to the orientation of said scene; and
    means for inverting said other rotated image to form the other half of said stereoscopic video frame.

2. The apparatus as claimed in claim 1 further comprising means for transmitting said stereoscopic video frame for viewing at a remote location.

3. The apparatus as claimed in claim 1 further comprising means for video recording of said stereoscopic video frame.

4. The apparatus as claimed in claim 1 wherein said first image rotating means comprises a first video screen rotated 90 degrees counterclockwise with respect to the orientation of said scene and displaying one of said images thereon,
    said second image rotating means comprises a second video screen rotated 90 degrees counterclockwise with respect to the orientation of said scene and displaying the other of said images thereon, said second video screen being spaced from and position at a 90 degree angle with respect to said first video screen; and
    said inverting means comprises a reflective surface mirror bisecting said 90 degree angle between said first and second video screens, said mirror having said reflective surface directed toward one of said screens.

5. The apparatus as claimed in claim 4 further comprising a video camera having a lens with a pre-determined viewing field directed toward one of said first or second video screen and said reflective surface of said mirror, said video camera being positioned so that one of said first or second video screen occupies one-half of the viewing field of said lens and said reflective surface of said mirror occupies the other half of the viewing field of said lens.

6. The apparatus as claimed in claim 4 wherein said first and second video screens are each conventional television screens.

7. The apparatus as claimed in claim 1 further comprising means for generating said left and right images of said stereo video image pair.

8. The apparatus as claimed in claim 4 further comprising a first video camera directed toward the left side of a subject and connected to one of said first or second video screen and a second video camera laterally spaced from said first video camera and directed toward the right side of said subject right video camera connected to the other of said first or second video screen.

9. The apparatus as claimed in claim 8 wherein said first video camera is further connected to one of a first or second LCD monitoring screen displaying one of said left or right image thereon and said second video camera is further connected to the other of said first or second LCD monitoring screen displaying the other of said left or right image thereon, said second LCD monitoring screen being laterally spaced from said first LCD monitoring screen; first optical path means whereby light from the left video image displayed upon one of said first or second LCD monitoring screen is transmitted to the left eye of a viewer for viewing; and second optical path means whereby light from said right video image displayed on the other of said first or second LCD monitoring screen is transmitted to the right eye of a viewer for simultaneous viewing, said first and second optical path means each comprising a first reflective surface mirror having its reflective surface directed toward one of said first or second LCD monitoring screens at a 45° angle with respect thereto and a second reflective surface mirror spaced from and parallel to said first reflective surface mirror having its reflective surface directed toward the reflective surface of said first reflective surface mirror.

10. The apparatus of claim 1 further comprising:
    first means for presenting one of the images of said stereoscopic video frame rotated 90 degrees clockwise with respect to the orientation of said formatted stereoscopic video frame;
    second means for independently presenting the other of said images of said stereoscopic video frame rotated 90 degrees clockwise with respect to the orientation of said formatted stereoscopic video frame proximate said first presenting means;
    means for polarizing the light from said left and right images at 90 degrees with respect to each other;
    means for reverting said inverted image and combining said left and right images on a common viewing surface for viewing; and
    left and right viewing means polarized at 90 degrees with respect to each other so that the left image is viewed on said common viewing surface by the left eye of a viewer through said left viewing means and the right image is simultaneously viewed on said common viewing surface by the right eye of a viewer through said right viewing means.

11. The apparatus as claimed in claim 10 wherein said first presenting means comprises a first video screen rotated 90 degrees in said clockwise direction displaying the left and right images of said stereoscopic video frame thereon and having one of said right or left images masked from view;

said second presenting means comprises a second video screen rotated 90 degrees in said clockwise direction and positioned at a 90 degree angle with respect to said first video screen, said second video screen displaying the left and right video images of said stereoscopic video frame thereon and having the other of said left or right image masked from view, said common viewing surface comprising a transparent panel having a first uncoated surface and an anti-glare coated surface, said transparent panel bisecting said 90 degree angle between said first and second video screens.

12. The apparatus as claimed in claim 11 wherein said first and second video screens are each conventional television screens.

13. A method of formatting the left and right images of a stereo video image pair of a scene in a single stereoscopic video frame, comprising the steps of:

rotating one of the images of the stereo video image pair 90 degrees with respect to the orientation of said scene to form one-half of a stereoscopic video frame;

independently rotating the other of the images of said stereo video image pair 90 degrees with respect to the orientation of said scene; and optically inverting said independently rotated other image to form the other half of said stereoscopic video frame.

* * * * *